Figure 1:
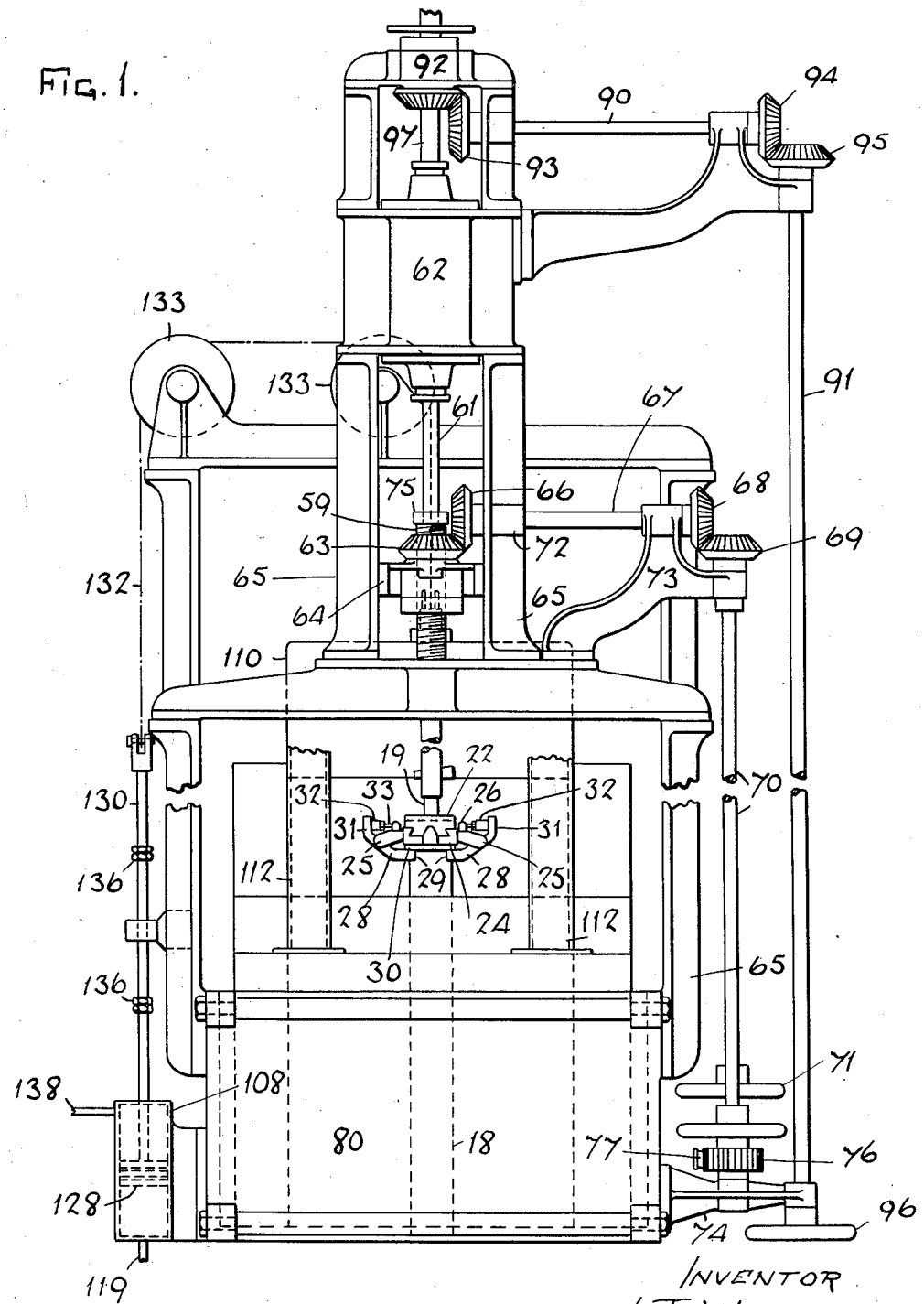

Sept. 24, 1935.  J. T. WOOD  2,015,211
GLASS FEEDING DEVICE
Filed Dec. 1, 1932  6 Sheets-Sheet 1

INVENTOR
J. T. WOOD
By Featherstonhaugh & Tansley
Att'ys

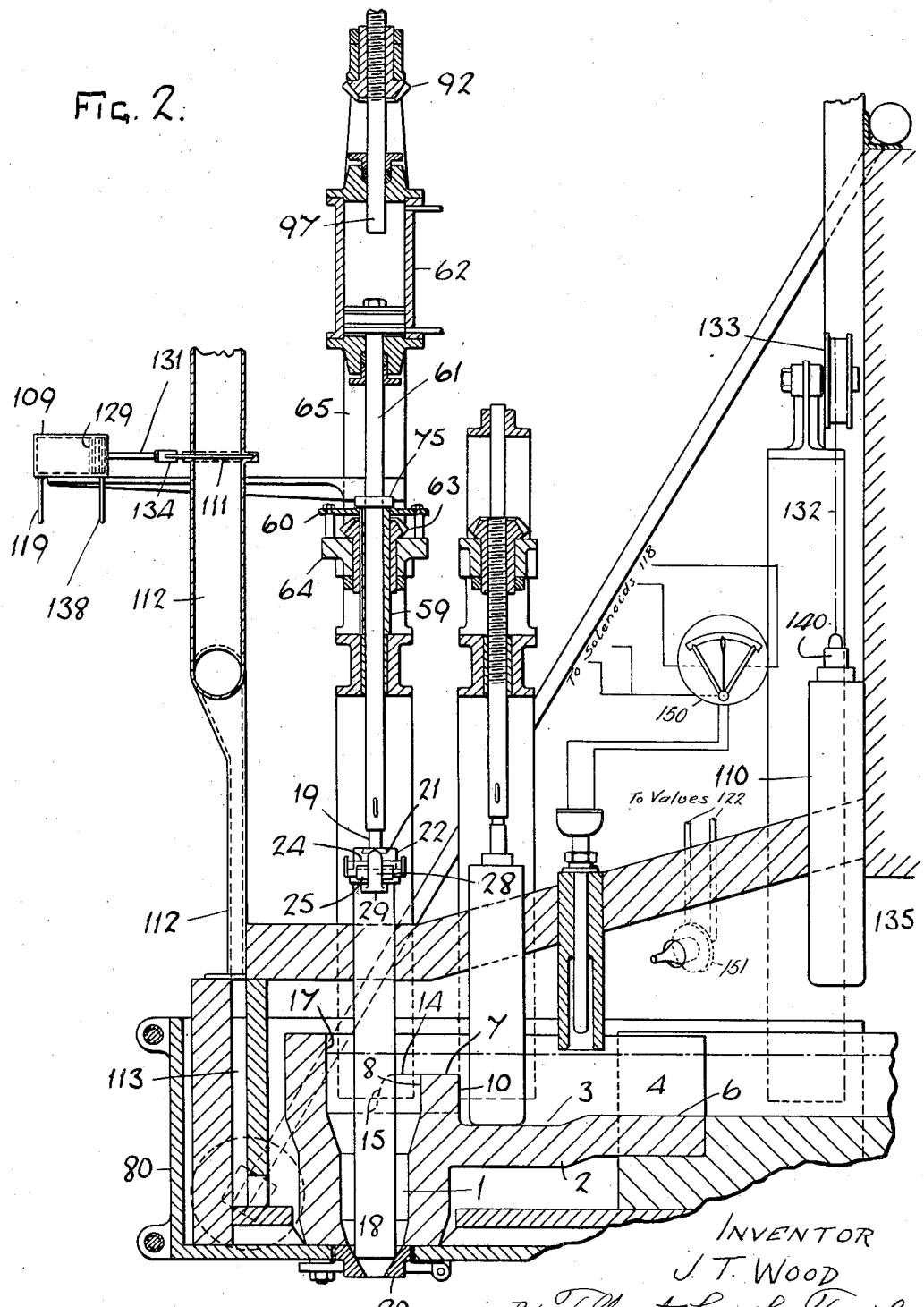

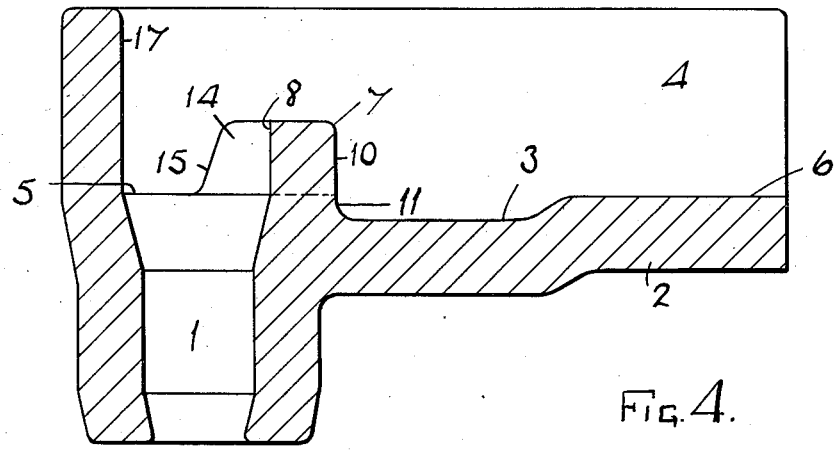
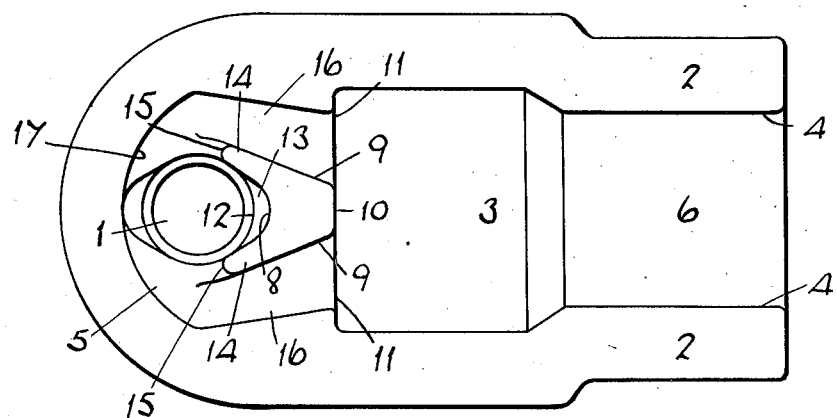
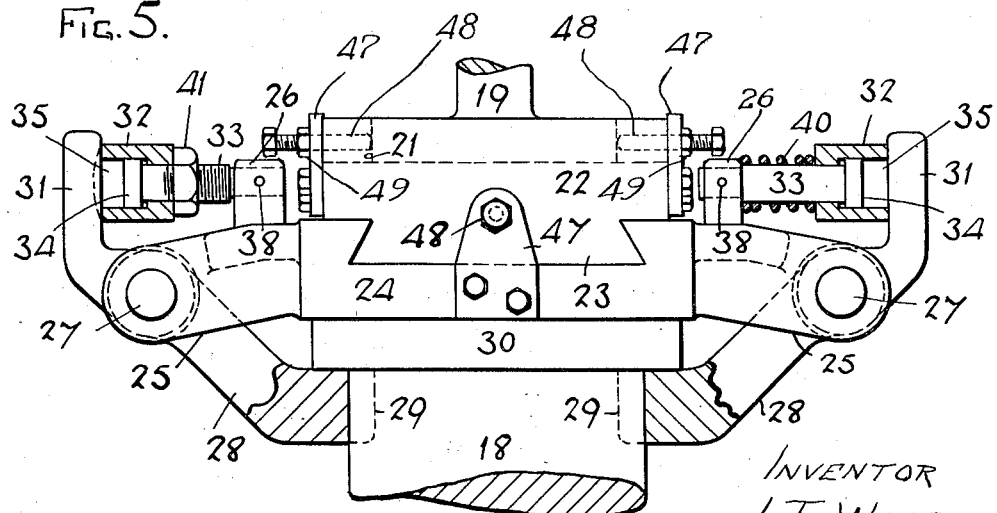

Sept. 24, 1935.  J. T. WOOD  2,015,211
GLASS FEEDING DEVICE
Filed Dec. 1, 1932  6 Sheets-Sheet 4
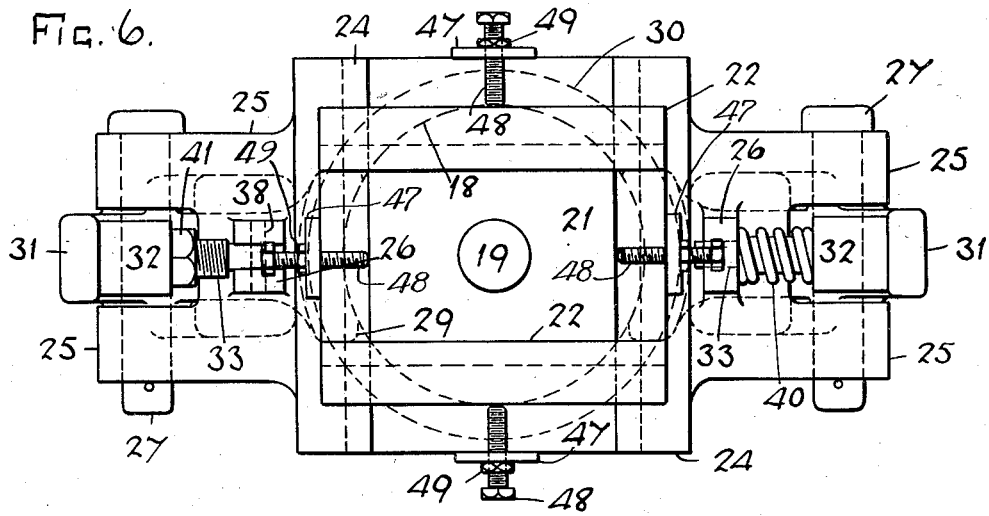
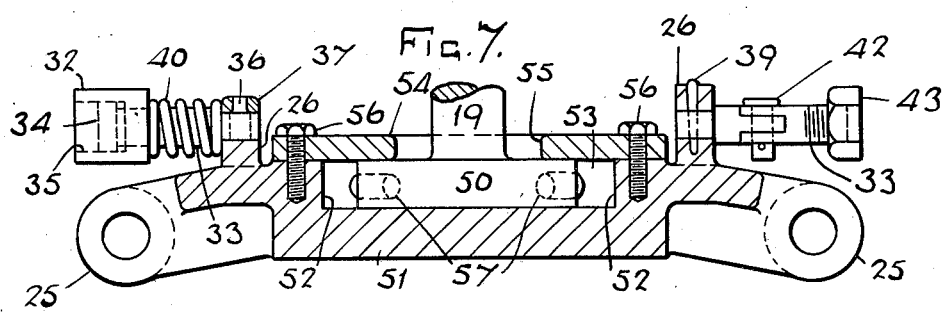
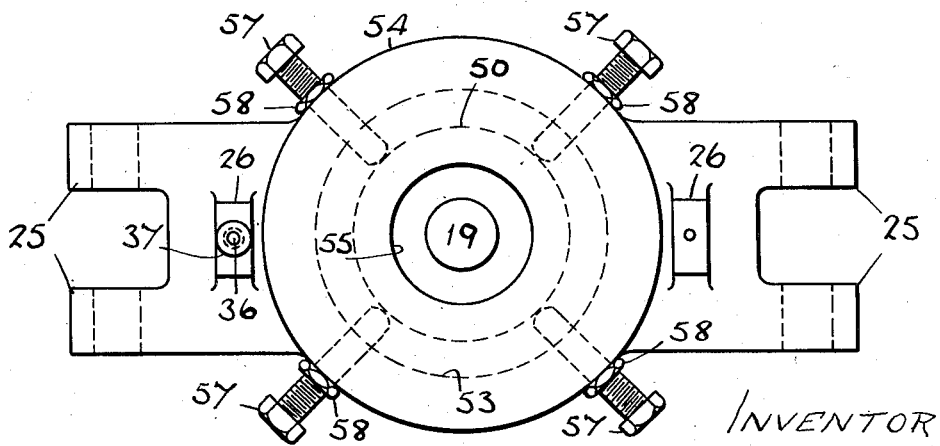
INVENTOR
J. T. WOOD
By Fetherstonhaugh & Tansley
Atty's Sept. 24, 1935.  J. T. WOOD  2,015,211
GLASS FEEDING DEVICE
Filed Dec. 1, 1932   6 Sheets-Sheet 5
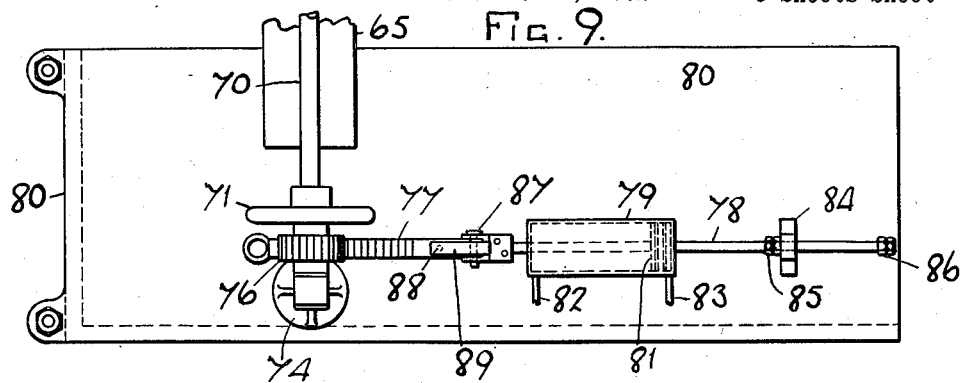
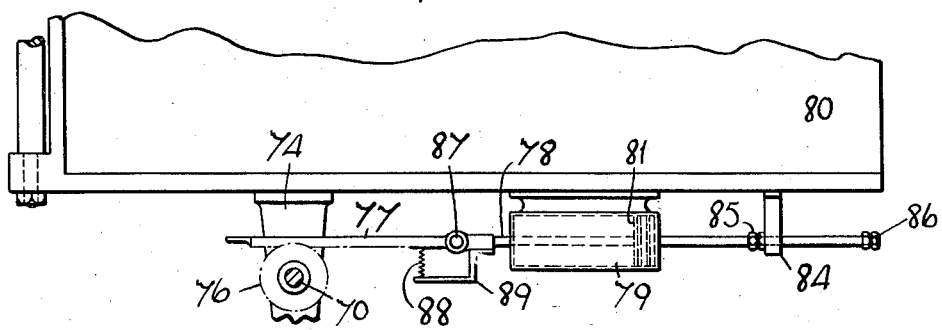
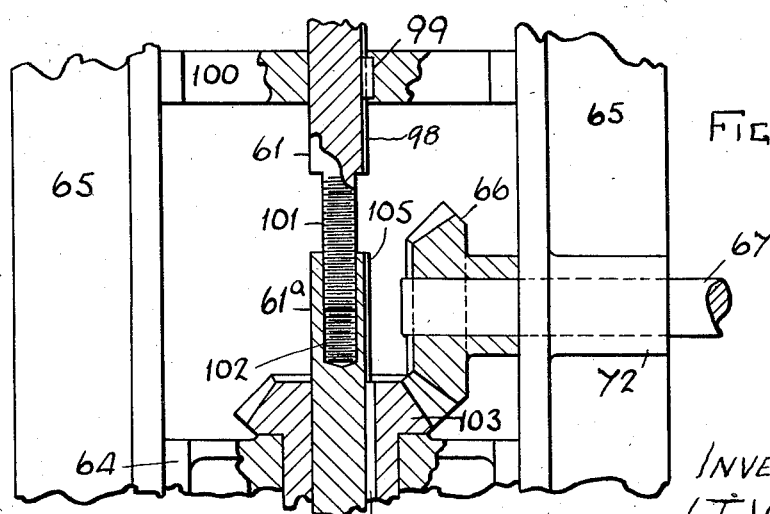
INVENTOR
J. T. WOOD
By Featherstonhaugh & Tansley
Atty's

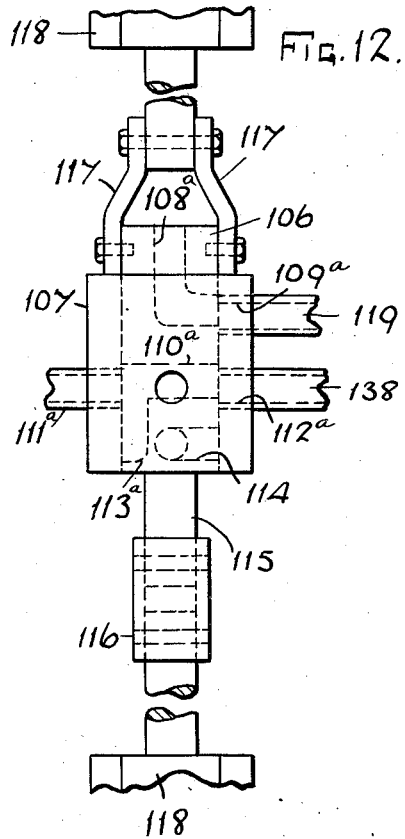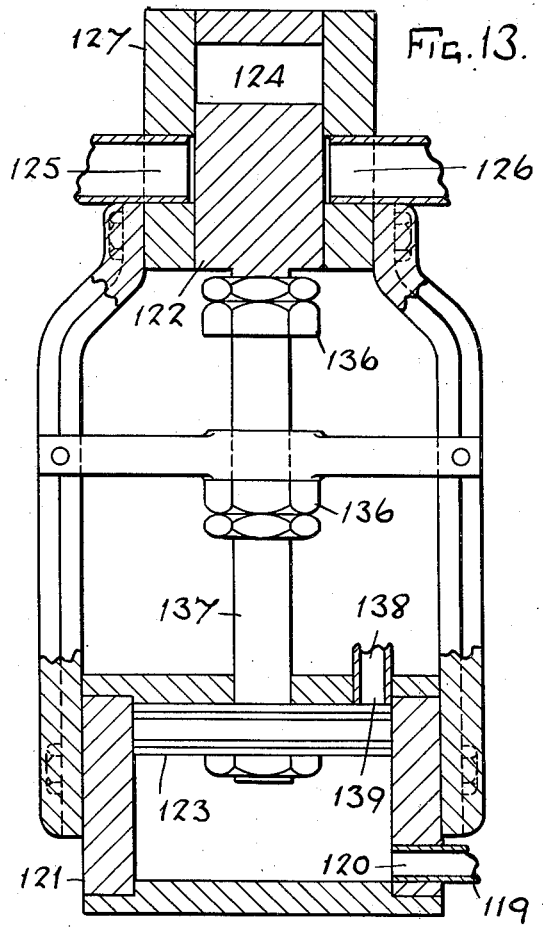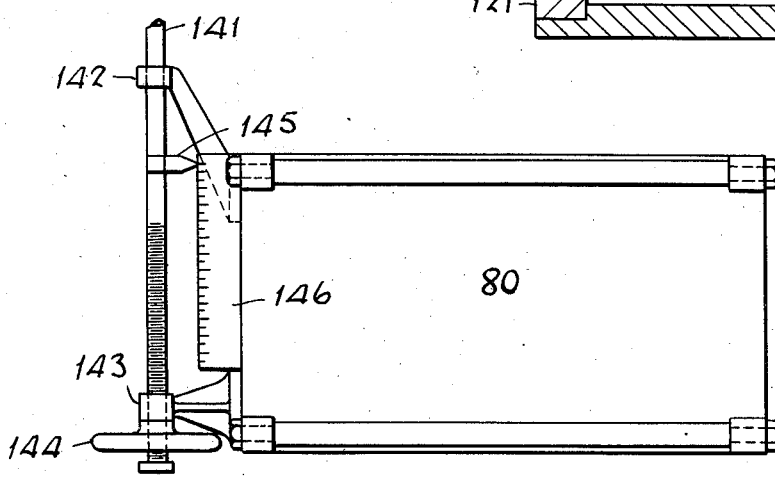

Patented Sept. 24, 1935

2,015,211

UNITED STATES PATENT OFFICE 2,015,211

GLASS FEEDING DEVICE

John Thomas Wood, Sale, England

Application December 1, 1932, Serial No. 645,285
In Great Britain December 11, 1931

7 Claims. (Cl. 49—55)

This invention relates to improvements in glass feeding devices heated by waste heat from the furnace, or gas or oil that are used in the manufacture of glass bottles and other articles, and it particularly relates to the type of feeder in which the molten glass is conveyed from the furnace to the glass forming machine through a horizontally extending "flow-feeder" or outer chamber, known as "the boot", made of fireclay or like refractory material having an outlet in the bottom near its outer end controlled by a vertical reciprocating plunger.

The object of this invention is to obtain an improved glass feeding machine by the combination of the following parts, namely, (a) improvements in the construction of the forehearth or "boot" of the feeder for obtaining a more even distribution of the flow of the molten glass to the outlet orifice; (b) the adjustment of the plunger for allowing it to be easily placed in position in vertical alignment with the outlet orifice, and its operation for delivering different predetermined weights of glass; (c) the control of the valves for supplying air and gas or oil to burners employed for heating the feeder, and (d) means for controlling the dampers respectively between the furnace and the forehearth or "boot" and in the chimney connected to the outlet flue.

In the drawings hereunto annexed—

Fig. 1 is a front elevation of a glass feeding machine constructed according to this invention;

Fig. 2 a sectional side elevation of Fig. 1;

Fig. 3 a sectional side elevation of a forehearth or "boot" of a glass feeding machine;

Fig. 4 a plan of Fig. 3;

Fig. 5 a part sectional elevation showing the means for attaching a plunger to the plunger piston rod whereby the said two parts may be adjusted in relation to each other;

Fig. 6 a plan looking on the top of Fig. 5;

Fig. 7 a sectional elevation of a modified arrangement of the adjusting means shown at Fig. 5;

Fig. 8 a plan looking on the top of Fig. 7;

Fig. 9 a side elevation of the automatic means employed for controlling the up and down vertical movement of the plunger;

Fig. 10 a part plan looking on the top of Fig. 9;

Fig. 11 a part sectional elevation showing an arrangement for shortening or lengthening the stroke of the plunger;

Fig. 12 an elevation showing a double acting valve controlled by a pair of solenoids;

Fig. 13 a sectional elevation showing a valve employed for controlling the supply of air, gas, or oil to the burners employed for heating the glass melting furnace;

Fig. 14 a front elevation showing an arrangement for controlling by hand the vertical movement of the plunger.

The above described figures are drawn to varying scales and like parts in all the views are marked with similar reference numerals.

Glass feeders have in some cases been provided with a channel having a flat horizontal surface which communicates directly with the outlet in the "boot", consequently there is a tendency for the glass to run down the side nearest to the furnace, whereby the molten glass is not evenly distributed around the said outlet and the plunger.

To overcome this difficulty in this invention at a suitable distance from the outlet 1 of the "boot" 2 a depression or recess 3 is formed in the bottom of the channel 4. The bottom 5 of the front portion of the channel 4 in the "boot" is on the same level as the bottom 6 at its rear end having the recess or depression 3 interposed between the two parts 5 and 6. On the floor 5 of the front portion of the channel 4 is formed an upstanding central piece 7,—of suitable height,—which is integral therewith and recessed in its front surface 8 and also provided with vertical sides 9, 9, which taper in an inward direction, that is, towards the recess or depression 3. The front 8 and rear surface 10 of the upstanding piece 7 are arranged vertically at or about the longitudinal centre thereof and respectively level with the lip 11 of the recess or depression 3 and with the lip 12 of the outlet orifice 1. The recess 13 in the upstanding portion forms two arms 14, 14, the front edges 15, 15, of which are suitably curved and inclined towards the vertical centre of the orifice 1. The two inclined sides 9, 9, of the upstanding piece 7 form channels 16, 16, which communicate with the front curved end 17 of the "boot" 2, and the said channels may be wider at their rear end,—that is, the lip 11,—than at the front, as shown at Fig. 4. By providing the two channels 16 with the central upstanding piece 7, and arms 14, 14, the molten glass as it passes from the furnace is diverted into the two channels 16, 16, which guide it to the front portion of the lip 12 of the orifice 1. At the same time part of the glass may be allowed to flow over the top of the upstanding piece 7, whereby the glass is evenly distributed around the lip 12 of the outlet orifice 1, and the distribution of the glass is uniform.

In this invention provision is also made for attaching the plunger 18 to the fixing rod 19,—as shown at Figs. 5 to 8,—in such a manner that it is capable of adjustment and replacement when necessary, whereby the plunger 18 may be easily centralized relative to the orifice ring 20,—Fig. 2,—or outlet 1 of the "boot" 2.

The above object is obtained by the plunger rod 19 having a slide 21 formed integral with its lower end, the said slide 21 being mounted in a slide holder 22, which, in turn, is provided with a slide 23 formed on its undersurface, the second slide 23 being mounted in a second slide holder 24. The just named arrangement permits of two slides 21, 23, being used arranged at a right angle to each other. The outer portion of the second slide holder 24 is provided at each side with a bifurcated lug 25 having an upstanding projection 26. In each of the said lugs 25 is mounted horizontally a pivot pin 27 arranged to carry a double ended lever 28, the lower arm of which is carried downwards a suitable distance and provided with an enlarged end 29, the upper surface of which is adapted to pass under the flange 30 of the plunger 18. The upper arm 31 of the said lever 28 is carried a suitable distance in an outward horizontal direction and then turned up vertically so as to provide a surface against which a spring controlled or other collar 32, slidably mounted upon a horizontal spindle 33, is arranged to engage. The horizontal spindle 33 is provided with a head 34 which is either formed thereon, or attached thereto, and which passes into a recess 35 formed for its reception in the collar 32. The opposite end is provided with a vertical hole through which passes a vertical pin 36,—Fig. 7,— formed on, or fixed to, the upstanding projection 26 on each lug 25 of the second slide holder 24. The top of the vertical pin 36 may either be screw-threaded for the reception of a nut, or it may be slightly reduced in diameter for the reception of a collar 37 through which a split pin is fixed for retaining it in its position.

In some cases the end of the just named horizontal spindle 33 may be reduced in diameter and pass through a hole or slot in the upstanding projection 26 of the said lugs, and when this last named arrangement is employed a split or other pin 38 is used for fixing or pivoting purposes, as shown at Fig. 5. Or, in other cases, it may be found more convenient to fix the said horizontal spindle 33 in position either by keying one of its ends in the projection, or by passing a taper pin 39,—Fig. 7,—vertically through it and the projection. Further, if desired, the spring 40 for controlling the collar 32 may be dispensed with and a nut 41 employed in place thereof. Or, the spring 40 and collar 32 may both be dispensed with, and when this is done the horizontal spindle 33 is formed in one piece or it is divided into two portions,—as shown at Fig. 7,—which are hinged or otherwise connected together by a pin 42 passing through them, and the outer end of the said spindle 33 is provided with a screwthread on which is or are mounted one or more nuts 43 for adjusting purposes. The spring controlled or other collars 32 or adjusting nuts 43 are employed for impinging against the upper end 31 of the double ended levers 28, whereby the periphery of the plunger 18 is gripped firmly by their lower enlarged clamping ends 29 for retaining the plunger 18,—which may be hollow or solid,—in a desired working position.

A plate 47 may be secured to each end of the slide holders 22, 24 and provided with a horizontal adjusting screw 48 on which a lock nut 49 may be mounted. In this type of locking means the end of an adjusting screw 48 will impinge against each end of the slides 21, 23 for retaining them in the desired position.

In some cases,—as shown at Figs. 7 and 8,—it may be found advisable only to provide a clamping device consisting of one slide 50. When this is done the lower portion 51 of the clamp is provided with the hereinbefore mentioned lugs 25, 25, and the base,—which forms the slide 50,—of the plunger fixing rod 19, may be of any suitable contour, as, for example, circular, or square, and may be in the form of a plate, as shown in the drawings.

A ring or plate 52, having a hole 53 in the centre thereof of the same contour as the base, may be fixed to the upper surface of the portion 51 to act as a distance piece, to the top of which is fixed a plate 54 provided with a circular or square hole 55 so as to provide an overlapping portion which passes over the top of the slide 50 of the plunger rod 19. In the plate 54 the circular or square hole 55 will require to be of such a size and shape as will permit of the rod 19 of the slide 50 working horizontally therein. The bosses or distance piece that are or is inserted between the upper surface of the portion 51, and the undersurface of the overhanging plate 54, require to be of such a depth as to correspond with the thickness of the slide 50 of the plunger rod 19. The overhanging plate 54, and in some cases the distance piece, are retained in position by set screws 56. In order to adjust the movement of the slide 50, horizontal set screws 57 are arranged in suitable positions to pass through the distance piece 52 at a right angle thereto, or, if desired, separate plates may be fixed to the perimeter of the lower portion 51 and the upper plate 54 and secured thereto by set screws, or other convenient means. In all cases the horizontal adjusting screws 57 are arranged to pass into the space between the upper surface of the portion 51 and the undersurface of the overhanging plate 54, said screws being provided with lock nuts 58. By adjusting the screws 57 the slide 50 is moved to any desired position in relation to the plunger 18 for centralizing it,—the plunger,—with the outlet 1 in the "boot" 2.

For delivering different predetermined weights of molten glass an adjustable stop 59 (Figs. 1 and 2),—prevented from rotation by a key carried by bracket 60 and keyway formed in the adjustable stop 59,—has been mounted upon the plunger piston rod 61 which is operated in a known manner by a cylinder 62. On the adjustable stop 59,—which is in the form of a screw threaded sleeve,—is mounted a mitre wheel 63 which is retained in its working rotatable position by a suitable bracket 64 fixed to the machine framework 65, the mitre wheel 63 being geared to a second mitre wheel 66 mounted upon a horizontal shaft 67 provided at its opposite end with a third mitre wheel 68 which gears with a fourth mitre wheel 69 at the top of a vertical shaft 70 which is operated by a hand wheel 71 mounted at a suitable distance from its lower end, the said shafts being carried in suitable bearings 72, 73, 74, formed on, or fixed to, the framework 65 of the machine. The adjustable stop 59 is arranged to intermittently engage with a fixed stop 75 secured to the plunger piston rod 61.

In this arrangement the position of the adjustable stop 59 is regulated by turning the hand wheel 71 which causes the vertical shaft 70 to be rotated, and by means of the mitre gearing 63, 66, 68, 69 herein described, raises or lowers the adjustable stop 59 to the required position in relation to the fixed stop 75 for lengthening or shortening the plunger's stroke.

In this invention at Figs. 1, 9, and 10, provision is made for automatically moving the before named adjustable stop 59 a predetermined distance alternately, thereby causing the plunger 18 to be moved so that the bottom thereof is a predetermined different distance away from the outlet ring 20 below the "boot" 2 on alternate strokes. By this arrangement two predetermined but different weights of molten glass are alternately fed by mechanism arranged as follows:—

A spur pinion 76 is secured to the lower end of the before named vertical shaft 70 and arranged to communicate with a rack 77 which is secured to the horizontal piston rod 78 of an operating cylinder 79 which, in turn, is fixed either to a separate framework or to the casting 80 of the feeder. The piston 81 and its rod 78 are caused to intermittently reciprocate in a forward and backward direction by compressed air which is admitted alternately through pipes 82, 83, at each end of the cylinder 79 in the usual manner, whereby the vertical shaft 70 will be rotated by the engagement of the rack 77 with the spur pinion 76 fixed on the shaft 70. The movement of the piston 81 and parts connected therewith lift and lower,—alternately,—the adjustable stop 59. To adjust the stroke of the piston 81 the piston rod 78 is extended in a rearward direction and passes through a bracket 84 which acts as a fixed stop and is secured to the casting 80 of the feeder.

On each side of the fixed stop 84 are provided adjustable stops 85, 86,—in the form of lock nuts,—whereby it is possible to adjust the stroke of the rack 77 as described. By adjusting the said nuts 85, 86, any length of stroke of the rack 77 and rotation of the pinion 76 may be obtained and transmitted by means of the vertical and horizontal shafts 70, 67, and mitre gearing 63, 66, 68, 69, thereon to the adjustable stop 59 on the top piston rod 61, thereby automatically moving the said stop upwards and downwards any desired distance in relation to the fixed stop 75 for regulating the stroke of the plunger 18. Instead of securing the rack 77 rigidly to the piston rod 78 it may be pivoted by pin 87 thereto and held in mesh with the spur pinion by a suitably coiled or other spring 88, supported by bracket 89. This arrangement is provided so as to permit of the operator being able to regulate the adjustable stop 59 by hand, and is accomplished by the rack 77 being first withdrawn from contact with the spur pinion 76 which permits of the hand wheel 71 on the vertical shaft 70 being turned in the desired direction. Compressed air is admitted to, and exhausted from, the operating cylinder 79 by existing or additional valves on the usual feeder timer that operates the glass feeding machine.

When it is desired to regulate the upward stroke of the plunger piston rod 61 by hand, means are provided in the form of additional vertical and horizontal shafts 90, 91,—Fig. 1,—having mitre gearing 92, 93, 94, 95, and a hand wheel 96, mounted thereon or connected thereto, which are arranged to adjust a vertical shaft 97, the lower end of which enters the top of the operating cylinder 62 of the plunger piston rod 61. This means for regulating the upward stroke of the piston rod 61 and plunger 18 is of ordinary construction, but if desired may be operated by the just described automatic means.

In some cases it may be found advisable to form the plunger piston rod 61 in two portions,—as shown at Fig. 11,—for automatically shortening and lengthening its stroke and consequently delivering predetermined different weights of molten glass through the orifice 1 of the "boot" 2, and outlet ring 20. When this is done the upper portion of the piston rod 61 is provided with a keyway 98, in which a key 99, carried by bracket 100, is arranged to work for preventing the rotation of the piston rod 61, and its lower part 101 is reduced in diameter and provided with a screw thread on its periphery. The lower and second part 61$^a$ of the piston rod 61 is provided with a central internal screw threaded hole 102 at its upper end which engages with the screw thread formed upon the reduced end 101 of the upper portion of the piston rod 61. On the lower portion of the piston rod 61, and at a suitable distance from its upper end, is slidably mounted a bevel or mitre wheel 103 which engages with the mitre or other wheel 66 mounted upon the first named horizontal shaft 67. The slidable bevel or mitre wheel 103 is provided with a key 104 which slides in a vertical keyway 105 formed in the end of the lower portion 61$^a$, or the said end may be made of a square or other suitable cross section so that the lower portion 61$^a$ of the piston rod 61 will rotate with the bevel or mitre wheel 103.

By the just described automatic means the lower portion 61$^a$ of the piston rod 61 is caused to travel up or down the screw threaded end 101 of the upper portion of the piston rod 61 for automatically lengthening or shortening the stroke of the plunger 18, and thereby regulating the weight of the glass to be delivered.

In order to control the temperature of the feeder between two predetermined degrees of heat, the following mechanism is employed:—

The temperature is arranged to be indicated or recorded on the usual type of indicating or recording pyrometer 150 as shown in Fig. 2. When the temperature has reached a given maximum an electrical circuit,—connected to the pyrometer,—is arranged to be completed and a second electrical circuit will be broken; when a given minimum is reached the second circuit will be completed and the first circuit will be broken in a known manner.

The means employed for controlling the temperature in a glass feeder,—and which are operated by the above named electrical circuits,—are arranged as follows:—

Compressed air is supplied from any suitable source to a valve of the type in which a number of ports and passages are provided in the valve plunger 106,—which acts as a valve,—and casing 107 so as to make a double acting valve, as shown at Fig. 12. The compressed air is supplied to the burner or burners 151,—employed for heating the feeder,—and also to two cylinders 108, 109,—Figs. 1 and 2,—which are respectively employed for operating the damper 110 between the furnace and the feeder, and the damper 111 arranged in the chimney 112 which is connected to the outlet flue 113 of the feeder. One single valve 106 may be employed for supplying the compressed air to the three just named parts, that is, the burners and the two operating cylinders 108 and 109, or three separate valves 106 may be employed for the same purpose. All of the valves 106,—when more than one is employed,—are of the same or similar construction. The first passage 108$^a$ in the plunger or valve 106 is L-shaped and communicates at one end with a port 109ª formed in the wall of the casing 107 and at its other end with the upper surface of the plunger 106 for forming an exhaust passage. A second horizontal passage 110ª is formed at or about the centre of the plunger's length which communicates with the compressed air inlet pipe 111ª and with a port 112ª. A vertical recess 113ª is formed in the periphery of the plunger 106 in such a manner that it passes in a downward direction from the central horizontal passage 110ª at the inlet end thereof. A third and L-shaped exhaust passage 114 is formed in the plunger 106 below the central horizontal passage 110ª so that when the plunger is in its lowest and normal position,—as shown at Fig. 12,—its outer ends are closed, compressed air only passing from the inlet pipe 111ª through the plunger 106 into and through ports 109ª or 112ª. The plunger 106 is provided at one or both of its ends with a stem 115 which projects a suitable distance beyond the end or ends of the casing 107 so as to enable each of the ends of the plunger 106 to be connected by a link 116,—secured to the stem 115,—or by brackets 117, 117, to a solenoid 118. The two solenoids 118, 118 are alternately energized by the before named electrical circuits operated by the pyrometer. When the maximum temperature is reached the first circuit is completed and the second circuit broken, whereby one of the solenoids 118,—say, the upper,—of each valve 106 employed will be operated, for moving the valve in an upward direction so that the position of the central passage 110ª will be opposite the compressed air inlet 111ª and the outlet 109ª. Compressed air will then pass along the air lines or tubes 119 to the inlet openings 120 arranged respectively at one of the ends of the cylinders 121 of a pair of valves 122,—constructed as shown at Fig. 13,— whereby the pistons 123 of the cylinders 121 will move the ports 124 formed in the valves 122 out of alignment with the inlet and outlet ports 125, 126, formed in their casings 127 for cutting off the supply of air and gas or oil to the burner or burners employed for heating the feeder. At the same time compressed air will pass through the double acting valve 106 along air lines or tubes 119, to inlet openings respectively at one of the ends of the pair of cylinders 108, 109,— Figs. 1 and 2,—employed for operating the furnace and chimney dampers 110, 111. When air is admitted to, say, the lower or outer end of each of the said cylinders 108, 109, the pistons 128, 129, and rods 130, 131, thereof are moved in an upward or horizontal direction for allowing the dampers 110, 111,—which are attached indirectly thereto by means of, say, chains or wire ropes 132 passing partially around pulleys 133, or directly by a link 134,—to be lowered or moved into position for wholly or partially closing the furnace heat space 135,—Fig. 2,—or orifice of the chimney 112. In some cases only one of the dampers 110, 111, is moved simultaneously with the cutting off of the air and gas or oil supply to the burner or burners. Suitable adjustable stops 136 are provided on the piston rod 130,—and in some cases on the rod 131,—of the just named operating cylinder 108, and also on the stems 137 of the compressed air and gas or oil valves 122 so that the strokes of the said valves and pistons may be controlled. By this arrangement the amount of compressed air and gas or oil supplied to the burner or burners, and the distance of travel of the damper or dampers, may be regulated as desired.

As the temperature in the feeder is reduced to a minimum as a result of the above named automatic operations, the first circuit will be broken and the second circuit completed for reversing the operations. The second solenoid 118, say, the lower, will now be energized for moving the double acting valve 106 so that the central horizontal passage 110ª is opposite to the inlet 111ª and the outlet 112ª, in the valve casing. Compressed air will then be allowed to pass along suitable air lines or tubes 138 to ports 139 respectively formed in the opposite ends of the cylinders 121 of the compressed air and gas or oil valves 122 and the damper operating cylinders 108, 109. When this operation takes place compressed air and gas or oil is admitted to the burner or burners through ports 124, 125, 126, the piston 130 of the furnace damper operating cylinder 108 moved downwards for lifting the said damper and allowing more heat to pass from the furnace into the heat spaces around the "boot" 2 in the feeder, and the chimney damper 111, simultaneously opened by the horizontal stroke of the piston 131 attached thereto.

By the double acting valve 106 being constructed as before described, air is admitted at one end of each of the operating cylinders 108, 109, 121, and passed out of the opposite end to be exhausted, through one of the exhaust passages 108ª, 114, in the said valve, to the atmosphere.

In some cases it may be found advisable to use only one solenoid 118, say, the upper, and move the double acting valve plunger 106 in the opposite direction by means of a spring or other similar device.

It will readily be understood that the described combination of a damper 110 for the furnace heat space 135, valves 122 for the burner or burners and a chimney damper 111 may be varied, that is, one or more of the said parts may be dispensed with or others added, or the said parts,—when all three are employed,—may be timed to work separately or only two may work simultaneously.

When preferred the automatically operated mechanism for regulating the damper 110 and controlling the amount of heat passing from the furnace, may be replaced by hand operated mechanism,—shown at Fig. 14,—in which case the following arrangement is employed, namely:—

The furnace damper 110, is made of refractory material, and provided with a suitably shaped clamp or gripping member 140 at its upper end by which it is attached to one end of the before named rope or chain 132 arranged to pass upward in a vertical direction to and partially around the first guide pulley 133, then horizontally to and partially around the second guide pulley 133, from whence it is carried downward in a vertical direction. All the just named parts are of the same construction as those employed for the automatic control of the damper 110. The second and free end of the rope or chain 132 is secured to a vertical rod 141 mounted in suitable bearings 142, 143, formed or fixed on, say, the feeder box casting 80. The lower end of the rod 141 is screw threaded for the reception of a hand wheel 144 which is arranged to impinge against the under surface of the lower bearing 143 so that when the hand wheel 144 is rotated the damper 110 will be raised or lowered through the rod 141 and rope or chain 132 according to the direction of rotation. A pointer 145 is fixed in a suitable position on the rod 141 and arranged to move up and down a scale 146,—marked in, say, inches,—provided on, say, the feeder box casting 80 so that the position of the damper 110 is indicated.

What I claim is:—

1. In glass feeding machines the combination of a fixing rod, a plunger having a flange formed thereon, a detachable clamp for adjustably securing the fixing rod to the plunger, means for centralizing the plunger with the outlet of the feeder, said means comprising a number of slides working in a corresponding number of slide holders, one of the slide holders being provided with a pair of bifurcated lugs in which are pivoted a pair of double ended levers, the lower enlarged ends of each of said levers being adapted to grip the periphery of the plunger below the flange form thereon, the upper ends of the said levers being thrust outwards by springs working against slidable collars mounted upon horizontal pins which in turn are secured to projections formed on the bifurcated lugs, and means for securing the slides in a fixed position, as set forth.

2. In glass feeding machines the combination of a plunger having a flange formed thereon, a fixing rod having a number of slides and their holders, one of the slides being formed on the fixing rod, a pair of bifurcated lugs formed on one of the slide holders, a double ended lever mounted in each bifurcated lug, the lower end of each of said levers being adapted to grip the plunger below the flange thereon, and means for controlling the upper ends of the double ended levers, comprising a pair of partially screw threaded headed pins pivoted to upstanding projections formed on the bifurcated lugs, sliding collars mounted upon the outer ends of the pivoted pins and nuts for adjusting the collars, as set forth.

3. In glass feeding machines, the combination of a plunger having a flange formed thereon, a fixing rod provided with a single slide and its holder, adjusting screws for controlling the slide, a pair of bifurcated lugs formed on the slide holder, a double ended lever mounted in each bifurcated lug, the lower end of each of the said levers being adapted to grip the plunger below the flange thereon, and means for controlling the upper ends of the said levers comprising a pair of partially screw threaded horizontal pins, each of said pins being formed in two parts pivoted together, and secured to an upstanding projection formed on the bifurcated lugs, and an adjusting nut mounted on the outer end of the horizontal pin, as set forth.

4. In glass feeding machines including an outlet orifice, a plunger operating therein and a piston rod attached to said plunger, means for automatically regulating the stroke of said plunger for delivering different predetermined weights of glass from said orifice comprising a stop fixed to said piston rod and a movable stop mounted on said piston rod for movement relative thereto, an operating cylinder actuated by compressed air, a piston in said cylinder, and means for transmitting the movements of said piston to the movable stop.

5. In glass feeding machines including an outlet orifice, a plunger operating therein and a piston rod attached to said plunger, means for automatically regulating the stroke of said plunger for delivering different predetermined weights of glass from said orifice comprising a stop fixed to said piston rod and a movable stop mounted on said piston rod for movement relative thereto, an operating cylinder actuated by compressed air, a piston in said cylinder, a piston rod attached to said piston, a rack rigidly fixed to said piston rod, a spur pinion in mesh with said rack, and gears and shafts connecting said spur pinion with said movable stop.

6. In glass feeding machines including a forehearth having an outlet therein, and a plunger operating in the outlet of said forehearth, means for regulating the temperature of the glass feeder comprising burners for heating said forehearth, a plurality of valves supplying air and fuel to the burners, flues opening into the forehearth, dampers positioned in the flues, operating cylinders connected to said valves and dampers, a plurality of double-acting valves adapted to supply compressed air to said operating cylinders, a pyrometer positioned in the forehearth, and solenoids operatively connected to said double-acting valves and energized by electrical circuits connected to said pyrometer, whereby the temperature is maintained between a predetermined maximum and minimum.

7. In a glass feeding machine including a forehearth having an outlet therein, a plunger operating in the outlet of said forehearth, burners for heating said forehearth, air and fuel valves connected to said burners, flues opening into said forehearth, and dampers in the flues, means for regulating the temperature of the glass in said forehearth including a temperature-responsive device positioned in the forehearth, operating cylinders for regulating said valves and dampers, a double acting valve for supplying compressed air to said operating cylinders, and means actuated by said temperature-responsive device for controlling said double acting valve.

JOHN THOMAS WOOD.